3,215,726
PROCESS FOR THE MANUFACTURE OF DERIVATIVES OF ALIPHATIC DICARBOXYLIC ACIDS
Kurt Sennewald, Knapsack, near Cologne, Alexander Ohorodnik, Neu-Berrenrath, near Cologne, Hugo Gudernatsch, Hermulheim, near Cologne, and Hermann Vierling, Hurth, near Cologne, Germany, assignors to Knapsack - Griesheim Aktiengesellschaft, Knapsack, near Cologne, Germany, a corporation of Germany
No Drawing. Filed May 24, 1962, Ser. No. 197,256
Claims priority, application Germany, May 26, 1961, K 43,829; Aug. 9, 1961, K 44,461; Apr. 12, 1962, 46,455
9 Claims. (Cl. 260—465.4)

The present invention relates to a process for the manufacture of derivatives of aliphatic dicarboxylic acids, especially adipodinitrile (adipic acid dinitrile). This type of compounds, for example, δ-cyano-valeric acid methylester (adipic acid monomethylester mononitrile), α-methyl-adipic acid dinitrile or α,α'-dimethyl-adipic acid dinitrile, are used in industry as valuable starting materials for making compounds of high molecular weight, for example for the manufacture of nylon, and they are therefore products of considerable commercial interest.

In industry, adipodinitrile is prepared either from adipic acid via its diamide or from a straight chain $C_4$-hydrocarbon by replacing suitable 1,4-substituents by CN-groups.

Another known process is based on the additive combination of hydrocyanic acid with 1-cyanobutadiene followed by the hydrogenation of the dicyanobutene formed.

All the processes which have been proposed so far for the manufacture of adipodinitrile are, however, rather expensive and costly.

Theoretically, it would appear obvious to prepare adipodinitrile by the linear dimerization of acrylic acid nitrile. Such synthesis, which would be of considerable technical interest, could, however, only be realized with very poor yields. Thus, for example, a 5% yield of adipodinitrile can be obtained from acrylic acid nitrile with the aid of sodium amalgam (Zeitschrift für Angewandte Chemie 61, 238 (1949)). In analogous manner and with the same poor yield, adipondinitrile can be obtained by reacting magnesium amalgam with a solution of acrylic acid nitrile in a mixture of benzene and methanol (U.S. Patent 2,439,308).

Substantially better yields of adipodinitrile—up to 62%, calculated on the reacted acrylic acid nitrile—may be obtained by linear dimerization if acrylic acid nitrile in 20% hydrochloric acid is treated with potassium amalgam. In this process, the polymerization of the acrylic acid nitrile is admittedly avoided; however, it cannot be avoided, due to the large excess of water, that β,β'-dicyanodiethylether is formed on the one hand, and that potassium amalgam on the other reacts so rapidly with the hydrochloric acid that as little as 10% of the hydrogen formed is used for the synthesis of adipodinitrile, whereas the remaining 90% escapes as unused gas.

The present invention provides a process for the manufacture, for example, of adipodinitrile based on acrylic acid nitrile in very good yields, calculated both on the acrylic acid nitrile and the amalgam consumed, wherein β-halogenopropionitrile, which has been obtained preferably by the additive combination of hydrogen halide with acrylic acid nitrile, is treated with an alkali metal and/or alkaline earth metal amalgam in the presence of acrylic acid nitrile.

The reaction mixture used as starting material in the process of this invention contains 20 to 90 mol percent β-halogenopropionitrile and 10 to 80 mol percent acrylic acid nitrile, and advantageously 50 to 80 mol percent β-halogenopropionitrile and 20 to 50 mol percent acrylic acid nitrile.

In carrying out the process of this invention adipodinitrile is obtained in yields as high as 90%, calculated on the total amount of acrylic acid nitrile consumed.

Up to 60% of the amalgam employed is utilized for the synthesis of adipodinitrile; the remainder reacts in undesired manner to form propionitrile which, however, can be technically utilized. The evolution of hydrogen sometimes observed and the formation of small amounts of resinous distillation residues are to the debit of the amalgam or energy consumption.

The maximum yields of adipodinitrile, calculated both on the total amount of acrylic acid nitrile consumed and the amount of amalgam employed, i.e. consumed, are obtained where the reaction mixture contains about 3 mols β-chloropropionitrile, 2 mols acrylic acid nitrile, 1 gram atom sodium in the form of a 0.5% liquid sodium amalgam and about 0.5 weight percent water.

According to a further embodiment of the present invention the ("energy") yield of adipodinitrile, calculated on the amalgam used, can unexpectedly be increased to considerably more than 60%, if the molar excess of β-halogenopropionitrile over acrylic acid nitrile advantageously used in the variant described above is replaced by a molar excess of acrylic acid nitrile over β-halogenopropionitrile. This reverse relation appeared primarily to be less favorable because acrylic acid nitrile in excess polymerizes readily. As taught in this invention, such polymerization can be avoided efficiently by means of an appropriate inhibitor, advantageously a compound having one or two unpaired electrons.

The present invention thus also relates to a process for the manufacture of adipodinitrile by reacting β-halogenopropionitrile in the presence of acrylic acid nitrile with an alkali metal and/or alkaline earth metal amalgam, the reaction being carried out in the presence of a suitable polymerization inhibitor for acrylic acid nitrile, for example hydroquinone.

It is advantageous to use as polymerization inhibitor at least one compound having one or two unpaired electrons, for example nitrogen monoxide or oxygen. It is especially suitable to use nitrogen monoxide in an inert gas atmosphere, for example in admixture with hydrogen or nitrogen.

The reaction mixture used as starting material should then contain 10 to 80 mol percent β-halogenopropionitrile and 20 to 90 mol percent acrylic acid nitrile. More especially, the reaction mixture should contain 20 to 50 mol percent β-halogenopropionitrile and 50 to 80 mol percent acrylic acid nitrile.

For reasons of economy it is especially advantageous to use as the β-halogenopropionitrile the chlorine compound.

For the manufacture of adipodinitrile from β-halogenopropionitrile and acrylic acid nitrile it is advantageous to use a liquid alkali metal or alkaline earth metal amalgam, preferably a 0.3 to 0.5% (weight percent) sodium or potassium amalgam, such as obtained by the electrolysis of alkali metal chlorides, and to add this amalgam dropwise and in portions to the reaction mixture.

In order to ensure a good separation of the mercury, respectively in order to avoid the formation of mercury-containing organic compounds, the reaction mixture is preferably admixed with 0.05 to 5 weight percent, preferably 0.5 to 1 weight percent, water.

When the reaction is carried out under anhydrous conditions or when too small a proportion of water is used, mercury-containing residues will be obtained; when more than 5 weight percent water is used, the water in excess undergoes an undesired side reaction with the amalgam with the resultant formation of hydrogen so that the costly amalgam is badly utilized and the conversion to adipodinitrile reduced.

In order to obtain good yields of adipodinitrile, it is advantageous to use, per gram atom of the alkali metal in amalgam form, about 3 mols β-halogenopropionitrile and about 3 to 9 mols acrylic acid nitrile.

The reaction of β-halogenopropionitrile with the acrylic acid nitrile and amalgam proceds with considerable evolution of heat so that the reaction temperature must be maintained constant at 20 to 100° C., preferably 35 to 65° C., by adding measured quantities of amalgam and by cooling.

The following statements are intended to better illustrate the process of the present invention used, for example, for making adipodinitrile.

Adipodinitrile can be synthesized neither with pure acrylic acid nitrile nor with pure β-halogenopropionitrile alone because the present process is concerned neither with a hydrogenating dimerization of the acrylic acid nitrile, nor with a Wurtz-type synthesis.

The course of the reaction which is based on a radical mechanism can be illustrated hypothetically as follows:

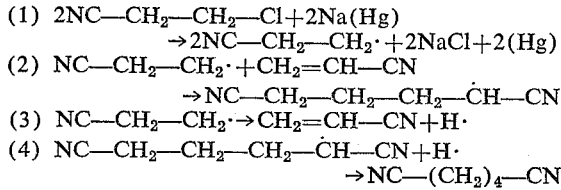

(1) $2NC-CH_2-CH_2-Cl + 2Na(Hg)$
$\rightarrow 2NC-CH_2-CH_2\cdot + 2NaCl + 2(Hg)$
(2) $NC-CH_2-CH_2\cdot + CH_2=CH-CN$
$\rightarrow NC-CH_2-CH_2-CH_2-CH-CN$
(3) $NC-CH_2-CH_2\cdot \rightarrow CH_2=CH-CN + H\cdot$
(4) $NC-CH_2-CH_2-CH_2-CH-CN + H\cdot$
$\rightarrow NC-(CH_2)_4-CN$

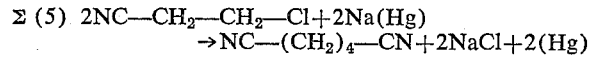

Σ (5) $2NC-CH_2-CH_2-Cl + 2Na(Hg)$
$\rightarrow NC-(CH_2)_4-CN + 2NaCl + 2(Hg)$

The above equations show that, per gram atom alkali metal, one mole alkali metal halide (e.g. sodium chloride) is obtained from one mol β-halogenopropionic acid nitrile. Formally, the radicals formed in these reactions are partially cyanoethylated with hydrogenation to adipodinitrile and partially stabilized with the splitting off hydrogen to form acrylic acid nitrile.

In this manner, the amount of hydrogen required for the cyanoethylation which is followed by hydrogenation is supplied intermediarily. The mercury left by the reaction of the alkali metal or alkaline earth metal amalgam is removed from the reaction mixture continuously or in portions, and the alkali metal halide obtained (e.g. sodium chloride) is separated in known manner, for example by centrifuging, and electrolyzed while using the mercury recovered as the cathode, whereby the alkali metal amalgam and the hydrogen halide resulting from the halogen, e.g. chlorine, formed by electrolysis, necessary for carrying out the process of the invention, are recovered.

Electrical energy is all that is required for cycling the alkali metal. The adipodinitrile obtained by reaction with a certain amount of alkali metal amalgam therefore indicates a measure for the utilization of energy. As shown in Equations 1 to 6 (see below) the alkali metal amalgam provokes the formation of adipodinitrile and propionitrile. Alternatively, the alkali metal amalgam may transform in the presence of rather substantial amounts of water into alkali metal hydroxide and hydrogen and thus be lost for the synthesis of adipodinitrile. Seen from a technological point of view, the utilization of alkali metal (energy) is an important factor. The examples described below therefore indicate the yield of substance, calculated both on the total amount of acrylic acid nitrile consumed, and on the amount of alkali metal employed.

The process of the present invention can be carried out continuously or discontinuously. Although the acrylic acid nitrile used as the starting material does not appear in summation Equation 5 above, it must be used from the very beginning of the reaction. The adipodinitrile obtained is always accompanied by the technically useful propionitrile which even becomes the main product when β-halogenopropionitrile is reacted with an alkali metal amalgam in the absence of acrylic acid nitrile or in the presence of a deficiency thereof. The radical formed according to Equation 1 then stabilizes as follows:

(6) $2NC-CH_2-CH_2\cdot$
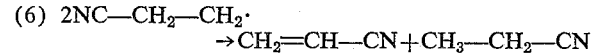
$\rightarrow CH_2=CH-CN + CH_3-CH_2-CN$

In this manner, acrylic acid nitrile in excess is obtained which, particularly in the case of continuous operation, must be removed from time to time from the distillation means and is then reacted with hydrogen chloride to form again β-chloropropionitrile. In view of the fact that the starting materials used for synthesizing adipodinitrile are substantially acrylic acid nitrile and hydrogen chloride—the alkali metal amalgam is not "consumed," but recovered in the cycle with the use of electrical energy—it is advantageous especially for continuous operation to relate the (substance) yield to the total amount of acrylic acid nitrile consumed partially as such and partially in the form of β-chloropropionitrile. In the discontinuous as well as in the continuous process there are used, per gram atom alkali metal (in the form of liquid amalgam), several mols β-chloropropionitrile and acrylic acid nitrile which so to speak serve incidentally as diluent. This excess of organic starting material is always recovered in the discontinuous process and used again.

In discontinuous operation as well it is suggestive that the yields be related to the amlgam which is present in the smallest molar proportion in the reaction mixture.

The amalgam is used to an extent of up to 75% for the synthesis of adipodinitrile; the remainder reacts in undesired manner as shown in Equation 6.

As already mentioned, the above processes unexpectedly involve neither a hydrogenating dimerization of the acrylic acid nitrile nor a Wurtz-type synthesis of the β-halogenopropionitrile, they are rather concerned with a radical-cyanoethylation followed by the hydrogenation in which the two reactants participate.

According to a still further feature of the present invention it has unexpectedly been found that the radical-initiated reaction between β-halogenopropionitrile and acrylic acid nitrile in the presence of an alkali metal or alkaline earth metal amalgam is based on a general principle, and that the reaction is of considerably greater importance than could be predicted beforehand. By varying the reaction components, a series of further interesting compounds of aliphatic dicarboxylic acids can be prepared. In the variants described above, the radical formed by splitting off halogen from β-halogenopropionitrile is reacted with acrylic acid nitrile the reaction being followed by hydrogenation, whereas in the last mentioned embodiment of the present invention the β-chloropropionitrile may be replaced by other halogeno-fatty acid derivatives, for example, β-chloropropionic acid alkylester, β-chloroisobutyric acid nitrile or chloroacetic acid alkylester, and the acrylic acid nitrile may be replaced by similar vinyl compounds, such as methacrylic acid nitrile or acrylic acid alkylester.

The δ-cyanovaleric acid methylester readily obtainable by the process of the present invention is of particular interest for the preparation of nylon-6, and the γ-cyano-vinylacetic acid methylester (glutaconic acid monomethylester mononitrile) is an especially interesting starting material for making the recently developed nylon-5.

More particularly, the full scope of the present invention embraces a process for the manufacture of derivatives of alpihatic dicarboxylic acids, wherein a halogeno-fatty acid derivative of the general formula:

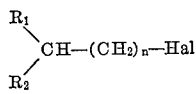

is treated with a vinyl group-containing compound of the general formula:

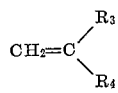

in the presence of an alkali metal or alkaline earth metal amalgam, in which formulae the substituents $R_1$ and $R_3$ represent individually and independently from one another a nitrile, carboxylic acid amide or carboxylic acid alkylester group, the alkyl group of the ester having 1 to 4 carbon atoms, $R_2$ and $R_4$ represent individually and independently from one another hydrogen or an alkyl group having 1 to 6 carbon atoms, and $n$ represents a whole number within the range of 0 to 5, preferably 0 or 1.

The reaction mixture used as starting material in the process of this invention should contain 20 to 90 mol percent of the halogeno-fatty acid derivative and 10 to 80 mol percent of the vinyl compound. More especially, it is advantageous to use reaction mixtures containing 50 to 80 mol percent of the halogeno-fatty acid derivative and 20 to 50 mol percent of the vinyl compound.

For reasons of economy, it is advantageous to use the chlorine prepresentative of the halogeno-fatty acid derivative.

For making derivatives of aliphatic dicarboxylic acids from halogeno-fatty acid derivatives and the vinyl compounds specified above, it is advantageous to use a liquid alkali metal or alkaline earth metal amalgam, preferably the technically readily accessible sodium amalgam. The amalgam generally used contains 0.3 to 0.5 weight percent alkali metal or alkaline earth metal, for example a sodium or potassium amalgam such as obtained by the electrolysis of alkali metal chlorides, the liquid amalgam being added dropwise in portions to the reaction mixture.

In order to ensure a good separation of the mercury, respectively in order to avoid the formation of organic compounds containing mercury, the reaction mixture is advantageously admixed with 0.05 to 5 weight percent, preferably 0.3 or 0.5 to 1 weight percent water.

When the reaction is carried out under anhydrous conditions or when too small a proportion of water is used, mercury-containing residues will be obtained; alternatively, when more than 5 weight percent water is used, the water in excess undergoes an undesired side reaction with the amalgam with the resultant formation of hydrogen so that the costly amalgam is badly utilized and the conversion to the desired dicarboxylic acid derivatives reduced.

The reaction of the halogeno-fatty acid derivatives with the vinyl compounds and the amalgam is accompanied by considerable evolution of heat so that the reaction temperature must be maintained at 20 to 100° C., preferably 35 to 65° C., by adding measured quantities of amalgam and by cooling.

The reaction of the halogeno-fatty acid derivatives with vinyl compounds in the presence of an alkali metal and/or alkaline earth metal amalgam may also be carried out in the further presence of a polymerization inhibitor for the vinyl compound, for example hydroquinone.

It is advantageous to use as polymerization inhibitor at least one compound having one or two unpaired electrons, for example nitrogen monoxide or oxygen. It is especially useful to employ nitrogen monoxide in an inert gas atmosphere, for example in admixture with hydrogen or nitrogen.

When an agent inhibiting the polymerization of the vinyl compound is used, the reaction mixture should also contain 10 to 80 mol percent of the halogeno-fatty acid derivative and 20 to 90 mol percent of the vinyl compound, preferably 20 to 50 mol percent of the halogeno-fatty acid derivative and 50 to 80 mol percent of the vinyl compound.

It is generally advantageous to use, per gram atom of alkali metal in amalgam form, about 1 to 10, preferably 1 to 3 mols of halogeno-fatty acid derivatives and the same molecular proportion of the vinyl component.

For the manufacture, for example, of the γ-cyano-vinyl-acetic acid methylester, it is suitable to use as the organic reaction components chloroacetic acid methylester and acrylic acid nitrile.

The course of the reaction which is based on a radical mechanism can be illustrated hypothetically as follows for the components claimed:

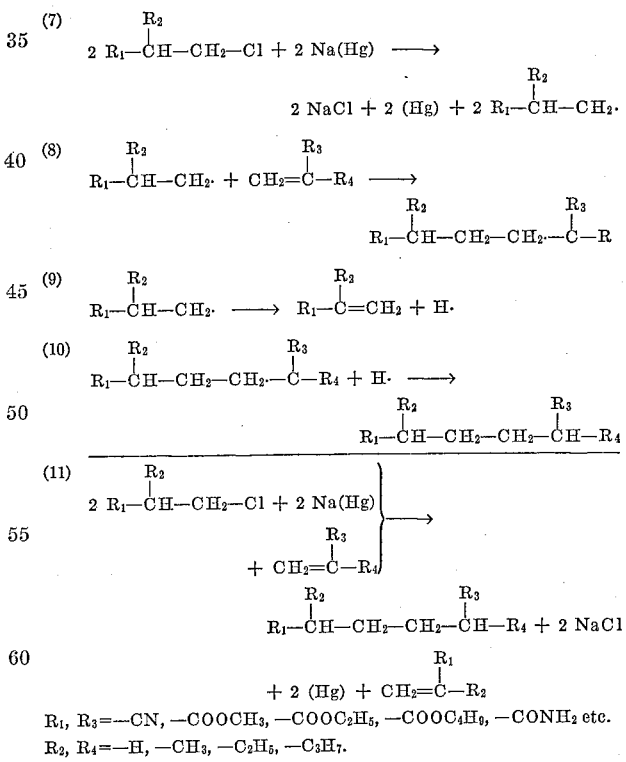

The above equations show that, per gram atom alkali metal, one mol alkali metal halide (for example NaCl) is obtained from one mol halogeno-fatty acid derivative. Formally, the radicals obtained by these reactions are partially vinylated and hydrogenated with the resultant formation of the dicarboxylic acid derivative, and partially stabilized with the splitting off of hydrogen to form a vinyl compound.

In this manner, the amount of hydrogen required for the vinylation which is followed by hydrogenation is supplied intermediarily. The mercury left by the reaction of the alkali metal amalgam or the alkaline earth metal amalgam is removed from the reaction mixture continuously or in portions, and the alkali metal halide or alkaline earth metal halide (for example NaCl) obtained simultaneously with the mercury is separated in known manner, for example by centrifuging the reaction liquid, and electrolyzed while using the mercury recovered as the cathode (electrolysis by the known mercury process), whereby the auxiliaries necessary for carrying out the present process, i.e. alkali metal amalgam and hydrogen halide (resulting from the halogen, e.g. chlorine, formed by electrolysis) are recovered.

Electrical energy is all that is required for conducting the alkali metal in a cycle. The dicarboxylic acid derivative obtained by reaction with a certain amount of alkali metal amalgam therefore indicates a measure for the utilization of energy. The alkali metal amalgam may also transform in the presence of rather substantial amounts of water into alkali metal hydroxide and hydrogen and thus be lost for the synthesis of the dicarboxylic acid derivative. Seen from a technical point of view, the utilization of alkali metal (energy) is an important factor. The examples described below therefore indicate the yield of substance, calculated both on the total amount of carbon atoms transferred to the final product, and on the amount of alkali metal employed.

The process of the present invention can be carried out continuously or discontinuously.

In either case, there are used, per gram atom alkali metal or alkaline earth metal (both in liquid amalgam form) several mols halogeno-fatty acid derivative and vinyl compound, which so to speak serve as diluents. This excess of organic starting material is always recovered even in the discontinuous process and used again.

As shown in Equation 9, a new vinyl compound

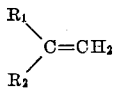

is obtained which, however, in the case of a reaction between β-halogeno-propionitrile and acrylic acid nitrile or between β-chloroisobutyric acid nitrile and methacrylonitrile (Example 14) or in the case of other reaction partners which correspond to one another in analogous manner, is identical with the vinyl component

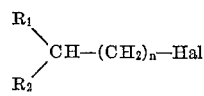

used. In all other cases as well, this newly formed vinyl compound is no undesired by-product which would reduce the yield of dicarboxylic acid derivative; the compound

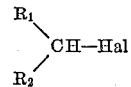

is rather separated by distillation and treated with hydrogen chloride gas (obtainable, for example, from the chlorine formed by the electrolysis of alkali metal chloride), so that the chlorofatty acid derivative

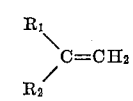

which is the necessary starting material is again formed in the cycle.

The vinyl compound

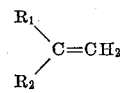

obtained according to Equation 9 may also replace the actual reaction partner

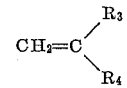

used in Equation 8, in which case a dicarboxylic acid derivative of the formula

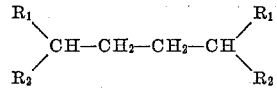

would be expected to form. Actually adipic acid dimethylester (Example 12) and adipic acid dinitrile (Example 13) are formed, however, in very subordinate amounts so that the reaction velocity would appear to be low in these cases. Moreover, a resinous distillation residue is always obtained as by-product.

The process of the invention is not limited to the working examples disclosed. It can be considerably varied by further combination of the various reaction partners. The case becomes interesting if in the general formula of the halogeno-fatty acid derivative $$R_1\!\!>\!\!CH\!-\!(CH_2)_n\!-\!Hal$$

$n$ represents zero. If, accordingly,

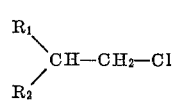

represents a chloroacetic acid ester and the vinyl component is acrylic acid nitrile, the following equations apply:

(12)  ROOC—CH₂—Cl+Na(Hg)→
ROOC—CH₂·+NaCl+(Hg)
(13)  ROOC—CH₂·+CH₂=CH—CN→
ROOC—CH₂—CH—CH—CN
(14)  ROOC—CH₂—CH₂—CH—CN→
ROOC—CH₂—CH=CH—CN+H·
(15)  H·+ROOC—CH₂·→CH₃—COOR

R represents an alkyl radical having 1 to 4 carbon atoms.

The course of the reaction illustrated in Equations 14 and 15 is different from that illustrated in Equations 9 and 10 for the reason that the dicarboxylic acid derivative radical in equation 14 unexpectedly does not form a saturated, but an unsaturated dicarboxylic acid derivative, in the present example a semiester of glutaconic acid nitrile. The hydrogen split off partially hydrogenates the radical ROOC—CH₂· formed in Equation 12 to the acetic acid ester, since this radical inversely cannot stabilize by splitting off hydrogen to form the vinyl compound, which would be in analogy to Equation 9. In other words, the side reaction of Equation 15 also leads to a technically useful product, the acetic acid ester.

The following examples serve to illustrate the invention but they are not intended to limit it thereto:

GENERAL WORKING DIRECTIONS FOR CARRYING OUT EXAMPLES 1 TO 8 INDICATED IN TABLE I BELOW

A stirring vessel jacketed to maintain a constant temperature was first charged with β-chloropropionitrile and/ or acrylic acid nitrile and water, if desired, and sodium or potassium in the form of a 0.5% liquid amalgam was then added dropwise in portions, while stirring, at the temperatures specified in the table below. After the alkali metal had reacted, the mercury was separated before fresh amalgam was permitted to flow in. The reaction times were as specified in the table. After the reaction was complete, the alkali metal chloride was separated from the reaction liquid and electrolyzed by the mercury process to recover amalgam while using the mercury liberated as the cathode. By distillative treatment of the batches adipodinitrile, propionitrile and distillation Example 3 describes a comparative test in which acrylic acid nitrile alone was used as the organic starting material.

Examples 4 to 6 illustrate especially the influence of water.

Examples 7 and 8 describe the reaction carried out in accordance with the present invention. The losses of material (distillation residue: polymers etc.), calculated on the total amonut of acrylic acid nitrile consumed, were within the order of 3%.

A comparison of Examples 7 and 8 with Example 5 shows that the cheap sodium is distinctly superior to potassium as regards the yield of adipodinitrile obtained.

Table 1

| Ex. No. | Starting material in grams | | | | Reaction conditions | |
|---|---|---|---|---|---|---|
| | β-Chloro-propionitrile | Acrylic acid nitrile | 0.5% liquid K- or Na amalgam | Amount of water added | Temp. (° C.) | Time |
| 1 | 448=5 mols | | 19.55 K=0.5 gram atom | | 40–41 | 4.75 hrs. |
| 2 | 268.5=3 mols | | 39.1 K=1 gram atom | 1.87=0.10 mol | 38–42 | 110 min. |
| 3* | | 20 | 0.89 gram atom K | 180 g. 20% hydrochloric acid. | 25 | 1 hr. |
| 4 | 268.5 | 106=2 mols | 39.1 K=1 gram atom | | 39–41 | 2.7 hrs. |
| 5 | 268.5 | 106 | 39.1 K | 1.87 | 39–43 | 54 min. |
| 6 | 716 | 106 | 44.4 Na=1.93 gram atom | | 40 | 75 min. |
| 7 | 268.5 | 106 | 23 Na=1 gram atom | 1.87=0.5 weight percent | 38–42 | 80 min. |
| 8 | 268.5 | 106 | 23 Na=1 gram atom | 1.5=0.4 weight percent | 38–42 | 80 min. |

| Ex. No. | Reaction products in grams | | | | Yield of substance calculated on total amount of acrylic acid nitrile consumed in percent | | | Yield of substance, calculated on amalgam consumed in percent | |
|---|---|---|---|---|---|---|---|---|---|
| | Adipodinitrile | Propionitrile | Distillation residue | Total amount | Adipodinitrile | Propionitrile | Residue | Adipodinitrile | Propionitrile |
| 1 | 1.5 | 10.1 | 0.5 | 12.1 | 12.4 | 83.5 | 4.1 | 5.5 | 73.5 |
| 2 | 12.5 | 19.6 | 1 | 33.1 | 37.8 | 59.2 | 3.8 | 23 | 71 |
| 3* | 5 | 14.5 | | 19.5 | 26 | 74 | | 10.5 | 30.1 |
| 4 | 29 | 1.2 | 14 | 44.2 | 65.6 | 2.7 | 31.7 | 53.5 | 4.5 |
| 5 | 27 | 5.3 | 3.5 | 35.8 | 75.4 | 14.8 | 9.8 | 50 | 19.5 |
| 6 | 33 | 1 | 7 | 41 | 80.5 | 2.9 | 17.1 | 32 | 1.9 |
| 7 | 30 | 4 | 1 | 35 | 85.7 | 11.6 | 2.9 | 55.5 | 14 |
| 8 | 32 | 2.5 | 1 | 35.5 | 90.2 | 7.0 | 2.8 | 59 | 9 |

*4.7 liters hydrogen were evolved during the reaction; the test was carried out in an externally cooled three necked flask.

residues were obtained. There was also obtained in Examples 1 and 2 and according to Equation 6 acrylic acid nitrile which was treated with hydrogen chloride to yield again β-chloropropionitrile.

The yields were calculated as follows:

The amounts of the three reaction products adipodinitrile, propionitrile and distillation residue were summed up to indicate the total amount in grams. The yield of each of these 3 reaction products is expressed in percent of that total amount. Since β-chloropropionitrile and acrylic acid nitrile were cycled both in the continuous and discontinuous processes and the additive combination of hydrogen chloride with the acrylic acid nitrile removed from the distillation means was approximately quantitative, there was justified reason to relate the percent yields of each of the three reaction products, expressed in percent of the total amount of the three reaction products, to the total amount of acrylic acid nitrile consumed.

In order to characterize the yields, the percentages of the alkali metal, for example sodium, are specified which had to be used reversibly for the synthesis of adipodinitrile and propionitrile. The remainder—about 15 to 30% alkali metal—was consumed irreversibly in a manner not exactly known during the formation of the distillation residue and hydrogen.

Examples 1 and 2 demonstrate that without initial addition of acrylic acid nitrile only minor amounts of adipodinitrile were obtained; Equation 6 became here the main reaction. The yield of adipodinitrile could be slightly improved by adding water.

General working directions for carrying out Examples 9 to 11 indicated in Table II below.

A stirring vessel jacketed to maintain a constant temperature was first charged with β-chloropropionitrile, acrylic acid nitrile and water, and sodium in the form of a 0.5% liquid amalgam was then added dropwise in portions, while stirring well, at the temperatures specified in Table II. During that time, about 15 bubbles of nitrogen monoxide per minute, corresponding to about 0.4 liter NO/hr., were introduced into the reaction mixture; a weak current of nitrogen or preferably hydrogen (about 2 to 5 liters $N_2$ or $H_2$ per hour) was passed through the gas chamber. After the sodium had undergone reaction, the mercury was separated before fresh amalgam was permitted to run in. The reaction times are indicated in Table II. After the reaction was complete, the sodium chloride was removed from the reaction liquid by centrifuging, electrolyzed by the mercury process to recover amalgam while using the mercury set free as the cathode. The reaction mixtures were worked up by distillation and yielded adipodinitrile, propionitrile and a distillation residue. Acrylic acid was obtained as a further product (cf. Equation 6) which was treated with hydrogen chloride to give again β-chloropropionitrile.

The yields were calculated in the manner set forth for the examples indicated in Table I above.

Examples 9 to 11 evidence that the yields of adipodinitrile, calculated both on acrylic acid nitrile and on amalgam, increase the presence of nitrogen monoxide with an increasing amount of acrylic acid nitrile in the reaction mixture.

Table II

| Example No | 9 | 10 | 11 |
|---|---|---|---|
| Starting materials: | | | |
| β-Chloropropionitrile in— | | | |
| Grams | 716 | 268.5 | 268.5 |
| Mols | 8 | 3 | 3 |
| Acrylic acid nitrile in— | | | |
| Grams | 106 | 159 | 318 |
| Mols | 2 | 3 | 6 |
| Sodium in the form of a 0.5% amalgam in— | | | |
| Grams | 23 | 23 | 23 |
| Gram atoms | 1 | 1 | 1 |
| Amount of water added in— | | | |
| Grams | 4.11 | 2.14 | 2.93 |
| Weight percent | 0.5 | 0.5 | 0.5 |
| Reaction conditions: | | | |
| Temperature, °C | 47–52 | 46–52 | 47–53 |
| Time in hours | 1.85 | 1.3 | 1.67 |
| Reaction products in grams: | | | |
| Adipodinitrile | 27 | 34.5 | 39 |
| Propionitrile | 11.4 | 3.9 | 3.1 |
| Distillation residue | 1 | 2.5 | 2 |
| Total amount | 39.4 | 40.9 | 44.1 |
| Substance yield, calculated on the total amount acrylic acid nitrile consumed: | | | |
| Percent adipodinitrile | 68.5 | 84.5 | 88.5 |
| Percent propionitrile | 29 | 9.5 | 7 |
| Percent residue | 2.5 | 6 | 4.5 |
| Substance yield, calculated on amalgam consumed: | | | |
| Percent adipodinitrile | 50 | 64 | 72 |
| Percent propionitrile | 41.5 | 14 | 11.5 |

EXAMPLE 12.—δ-CYANO-VALERIC ACID METHYLESTER (ADIPIC ACID MONOMETHYLESTER MONONITRILE)

A stirring vessel jacketed to maintain the temperature constant was first charged with 1225 grams (10 mols) β-chloropropionic acid methylester, 530 grams (10 mols) acrylic acid nitrile and 9.5 cc. water, and 9.25 gram atoms (213 grams) sodium in the form of 0.5% liquid amalgam were then added dropwise in portions, while stirring well, within 5 hours and at a temperature of 40 to 50° C. After the sodium had undergone reaction, the mercury was separated before fresh amalgam was allowed to run in. After the reaction was complete, the sodium chloride was removed from the reaction liquid by centrifuging, and electrolyzed by the mercury process to recover amalgam and chlorine, while using the mercury set free as the cathode. The reaction mixture was worked up by distillation and yielded:

398 grams (2.76 mols) δ-cyano-valeric acid methylester
18 grams (0.1 mol) adipic acid dimethylester
38 grams distillation residue (loss)

During the distillation there was also recovered the β-chloropropionic acid methylester in excess and acrylonitrile, which were used again. There was also obtained (cf. Equation 9) acrylic acid methylester which was treated with hydrogen chloride (obtained from hydrogen and chlorine emanating preferably from the NaCl-electrolysis) to yield again β-chloropropionic acid methylester. In the discontinuous process described in the present example, the starting materials cycled have been considered in calculating the yields. The only losses involved are thus the distillation residue. The yield of δ-cyano-valeric acid methylester, calculated on carbon (C-yield), this amounted to about 88%, the yield calculated on sodium, to 60%.

The yields of δ-cyano-valeric acid methylester were considerably impaired when β-chloropropionitrile and acrylic acid methylester were used for carrying out the reaction. In this case, a rather large amount of adipodinitrile was obtained.

EXAMPLE 13.—α-METHYL-ADIPODINITRILE

The procedure was the same as that used in Example 12.
Starting materials:
134 grams (2 mols) methacrylic acid nitrile
268.5 grams (3 mols) β-chloropropionitrile
1.8 grams water 1 gram atom (23 grams) sodium in the form of a 0.5% liquid amalgam was added dropwise within 2.1 hours at a temperature of 38 to 42° C. The reaction mixture was worked up and yielded:

16.0 grams α-methyl-adipodinitrile
1.5 grams adipodinitrile
1.0 gram residue (loss)

The C-yield of 2-methyl-adipodinitrile thus amounted to 86.5%, the yield, calculated on sodium, to 26.2%.

EXAMPLE 14.—α,α'-DIMETHYLADIPODINITRILE

The procedure was the same as that used in Example 12.
Starting materials:
134 grams (2 mols) methacrylic acid nitrile
310.5 grams (3 mols) β-chloroisobutyric acid nitrile
2.0 grams water 1 gram atom (23 grams) sodium in the form of 0.5% liquid amalgam was added dropwise within 7.3 hours at a temperature of 40 to 42° C. Th reaction mixture was worked up and yielded:

7.5 grams, α,α'-dimethyladipodinitrile
1.8 grams residue

The C-yield amounted to 80%, the yield calculated on sodium, to 11%.

EXAMPLE 15.—γ-CYANO-VINYLACETIC ACID METHYLESTER (GLUTACONIC ACID MONOMETHYLESTER MONONITRILE)

The procedure was the same as that used in Example 12.

Starting materials:
519 grams (5.5 mols) chloroacetic methylester
292 grams (5.5 mols) acrylic acid nitrile
4 grams water 4.22 gram atoms (97 grams) sodium in the form of 0.5% liquid amalgam were added dropwise within 4.5 hours at a temperature of 40° to 50° C.

The reaction mixture was worked up as usual and yielded:

(1) 74 grams (1 mol) acetic acid methylester
(2) 207 grams (1.2 mols) γ-cyano-vinylacetic acid methylester
(3) 44 grams residue (loss)

The yield of useful products (1) and (2) amounted to 86.5%, calculated on carbon (C-yield), and to 52%, calculated on sodium.

We claim:
1. A process for the production of a compound whose formula is selected from the group consisting of

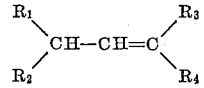

and

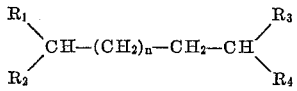

comprising contacting a chloro-fatty acid derivative having the general formula selected from the group consisting of

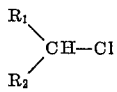

and

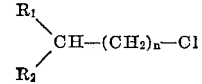

respectively at a temperature between 20° and 100° C. with a vinyl compound having the formula

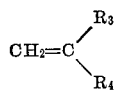

in the presence of a liquid amalgam consisting of about 0.3 to 0.5 weight percent of a metal selected from the group consisting of alkali metal and alkaline earth metal, and the balance mercury, wherein $R_1$ and $R_3$ represent independently a member selected from the group consisting of CN, $CONH_2$ and COOR wherein R is alkyl having 1 to 4 carbons, at least one of $R_1$ and $R_3$ being CN; $R_2$ and $R_4$ represent independently a member selected from the group consisting of hydrogen and alkyl having 1 to 3 carbons, and $n$ represents an integer of from 1 to 5.

2. A process as claimed in claim 1, wherein there is used a mixture of about 20 to 90 mol percent of the chloro-fatty acid derivative and about 10 to 80 mol percent of the vinyl compound.

3. A process as claimed in claim 1, wherein 0.05 to 5 weight percent water is present during contacting.

4. A process as claimed in claim 1, wherein the amalgam used is a liquid sodium amalgam.

5. A process as claimed in claim 1, wherein mercury obtained during the reaction of the amalgam is removed from the reaction mixture, and the chloride which is simultaneously obtained with the mercury and consists of a substance selected from the group consisting of alkali metal chlorides and alkaline earth metal chlorides, is separated from the reaction mixture and electrolyzed by the mercury process to recover from said chloride the auxiliary substances required for carrying out the reaction, which are amalgam and hydrogen chloride.

6. A process as claimed in claim 1, wherein the reaction is carried out in the presence of a polymerization inhibitor for the vinyl compound selected from the group consisting of nitrogen monoxide and oxygen.

7. A process as claimed in claim 6, wherein there is used a mixture composed of about 10 to 80 mol percent of the chloro-fatty acid derivative and about 20–90 mol percent of the vinyl compound.

8. A process as claimed in claim 1, wherein, per gram atom alkali metal in amalgam form, about 1 to 10 mols of the chloro-fatty acid derivative and about 1 to 10 mols of the vinyl component are used.

9. A process as claimed in claim 6, wherein, per gram atom alkali metal in amalgam form, about 3 mols β-chloropropionitrile and about 3 to 9 mols acrylic acid nitrile are used.

References Cited by the Examiner

Darzens: C.A., vol. 31, 1937, p. 1767.
Darzens et al.: C.A. vol. 32, 1938, p. 3416.

CHARLES B. PARKER, *Primary Examiner.*